United States Patent [19]

Jarrell

[11] 4,350,587

[45] Sep. 21, 1982

[54] SEWAGE TREATMENT SYSTEM

[75] Inventor: Donald Jarrell, 4510 Glendale Pl., Nashville, Tenn. 37215

[73] Assignees: Donald Jarrell; John G. Logan; Richard H. Carpenter, all of Nashville, Tenn. ; a part interest

[21] Appl. No.: 213,665

[22] Filed: Dec. 5, 1980

[51] Int. Cl.$^3$ ............................................. C02F 3/04
[52] U.S. Cl. .................................. 210/151; 210/173; 210/194; 210/205; 210/256
[58] Field of Search ............... 210/615, 748, 760, 150, 210/151, 173, 194, 195.1, 200-202, 205-207, 209, 218, 220, 256; 4/319, 320; 261/78

[56] References Cited

U.S. PATENT DOCUMENTS

| | | | |
|---|---|---|---|
| 2,050,771 | 8/1936 | Wait | 204/32 |
| 2,798,227 | 7/1957 | Boester | 4/10 |
| 2,956,503 | 10/1960 | Neidl | 103/103 |
| 3,005,597 | 10/1961 | Neidl | 241/255 |
| 3,060,862 | 10/1962 | Neidl | 103/103 |
| 3,067,960 | 12/1962 | Neidl | 241/255 |
| 3,113,734 | 12/1963 | Neidl | 241/74 |
| 3,120,353 | 2/1964 | Neidl | 241/46 |
| 3,276,994 | 10/1966 | Andrews | 210/760 X |
| 3,408,288 | 10/1968 | Messa | 210/20 |
| 3,440,669 | 4/1969 | Boester | 4/10 |
| 3,502,274 | 3/1970 | Neidl | 241/46.11 |
| 3,567,629 | 3/1971 | Ayers et al. | 210/615 |
| 3,617,541 | 11/1971 | Pan | 210/615 |
| 3,640,474 | 2/1972 | Neidl | 241/46.02 |
| 3,660,277 | 5/1972 | McWhirter et al. | 210/760 X |
| 3,666,106 | 5/1972 | Green | 210/201 |
| 3,695,439 | 10/1972 | Dupre | 210/173 |
| 3,730,881 | 5/1973 | Armstrong | 210/195 X |
| 3,737,110 | 6/1973 | Neidl | 241/43 |
| 3,772,188 | 11/1973 | Edwards | 210/760 X |
| 3,779,909 | 12/1973 | Wisfeld et al. | 210/29 |
| 3,824,632 | 7/1974 | Bach et al. | 4/12 |
| 3,835,039 | 9/1974 | Ciambrone | 210/192 X |
| 3,843,062 | 10/1974 | Neidl | 241/46.11 |
| 3,845,908 | 11/1974 | Friedenreich et al. | 241/46.11 |
| 3,847,803 | 11/1974 | Fisk | 210/8 |
| 3,891,554 | 6/1975 | Cooper et al. | 210/176 X |
| 3,974,528 | 8/1976 | Claunch et al. | 4/10 |
| 4,013,552 | 3/1977 | Kreuter | 210/748 X |
| 4,076,617 | 2/1978 | Bybel et al. | 210/748 |
| 4,170,797 | 10/1979 | Sundberg | 4/300 |

Primary Examiner—Thomas G. Wyse
Attorney, Agent, or Firm—Burns, Doane, Swecker & Mathis

[57] ABSTRACT

An on-location sewage treatment apparatus comprises a tank and a cylindrical wall therein arranged to form therewith a plurality of series-connected pre-treatment compartments. A grinder receives and grinds sewage-containing liquid and introduces same in the form of a colloidal mixture into a first of the pre-treatment compartments. The colloidal mixture gravitates between the pre-treatment compartments, the waste matter being aerobically consumed by bacteria therein. A second cylindrical wall spaced inwardly of the first endless wall forms therewith an intensive treatment compartment which receives pre-treated liquid. An upright porous sheet in the intensive treatment compartment is arranged in a circular accordian-pleated configuration. The sheet supports a bacteria culture thereon which consumes waste matter in the mixture passing through the sheet. Pure oxygen gas is introduced into each of the compartments and includes a sound wave generator for dispersing the oxygen gas. A third cylindrical porous wall disposed within the second wall defines a disinfecting compartment. Ozone gas is introduced into the disinfecting compartment to disinfect the liquid. Pure oxygen formed as a reaction product in the disinfecting compartment is collected and conducted back to the previous compartments.

11 Claims, 13 Drawing Figures

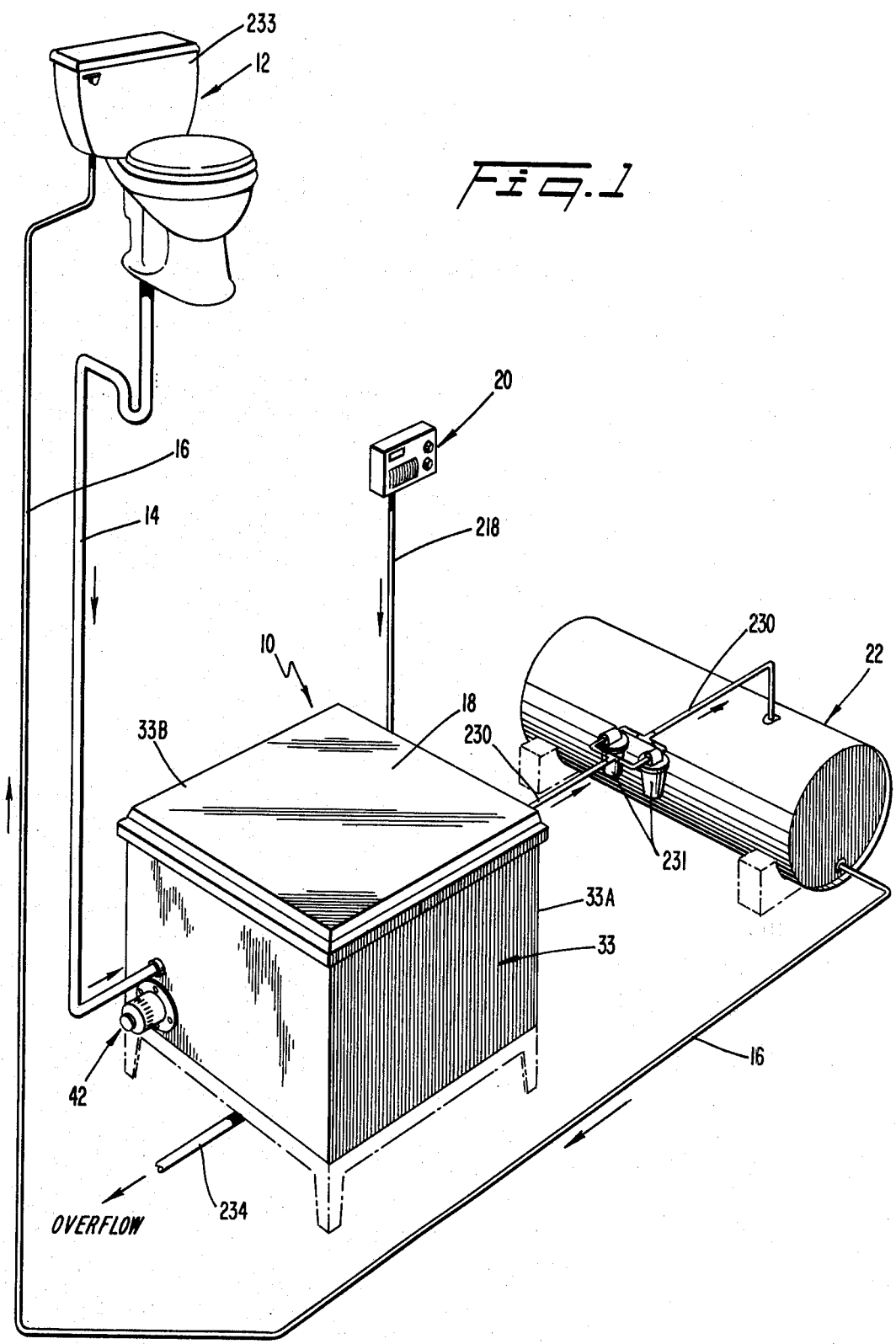

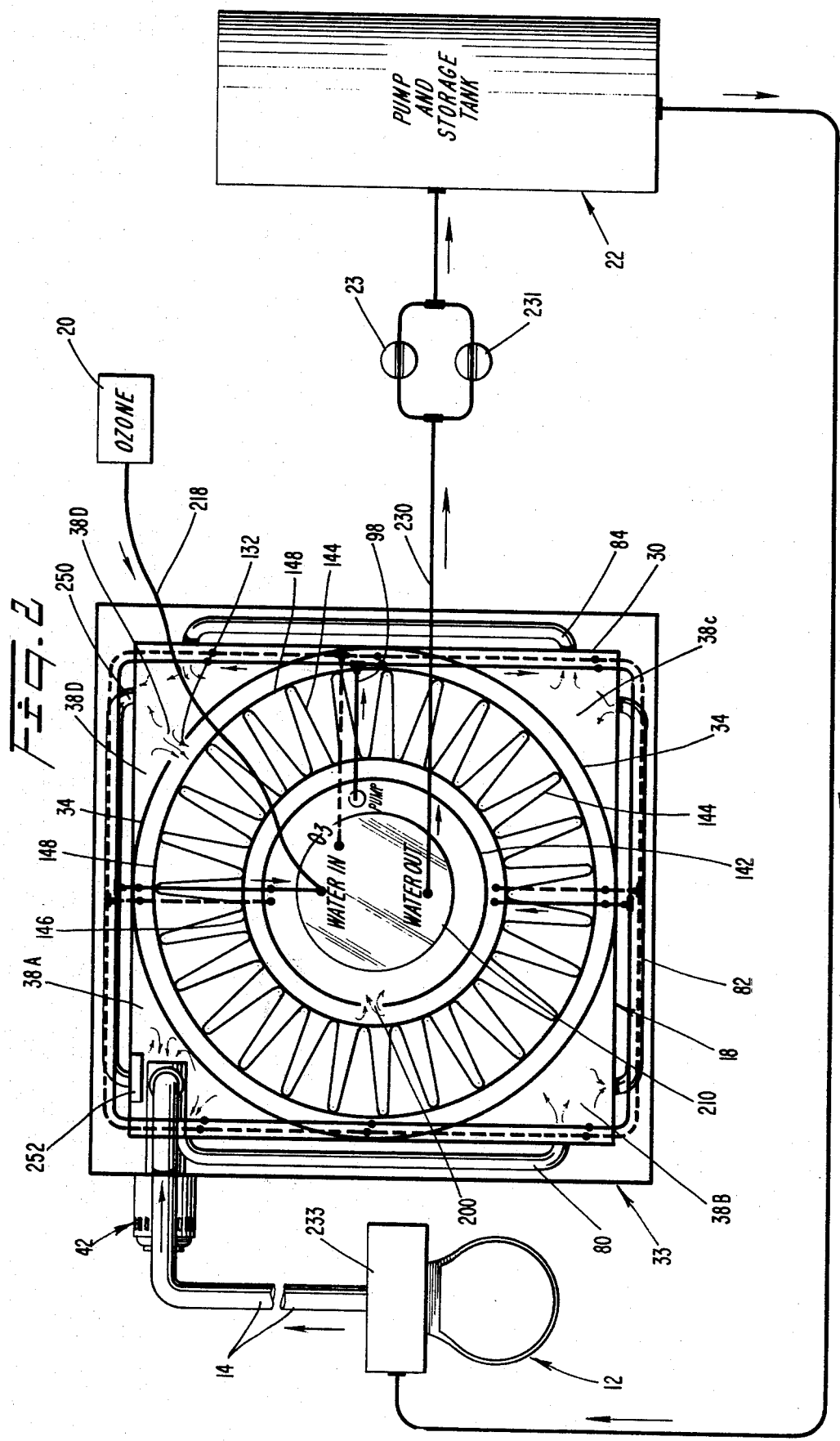

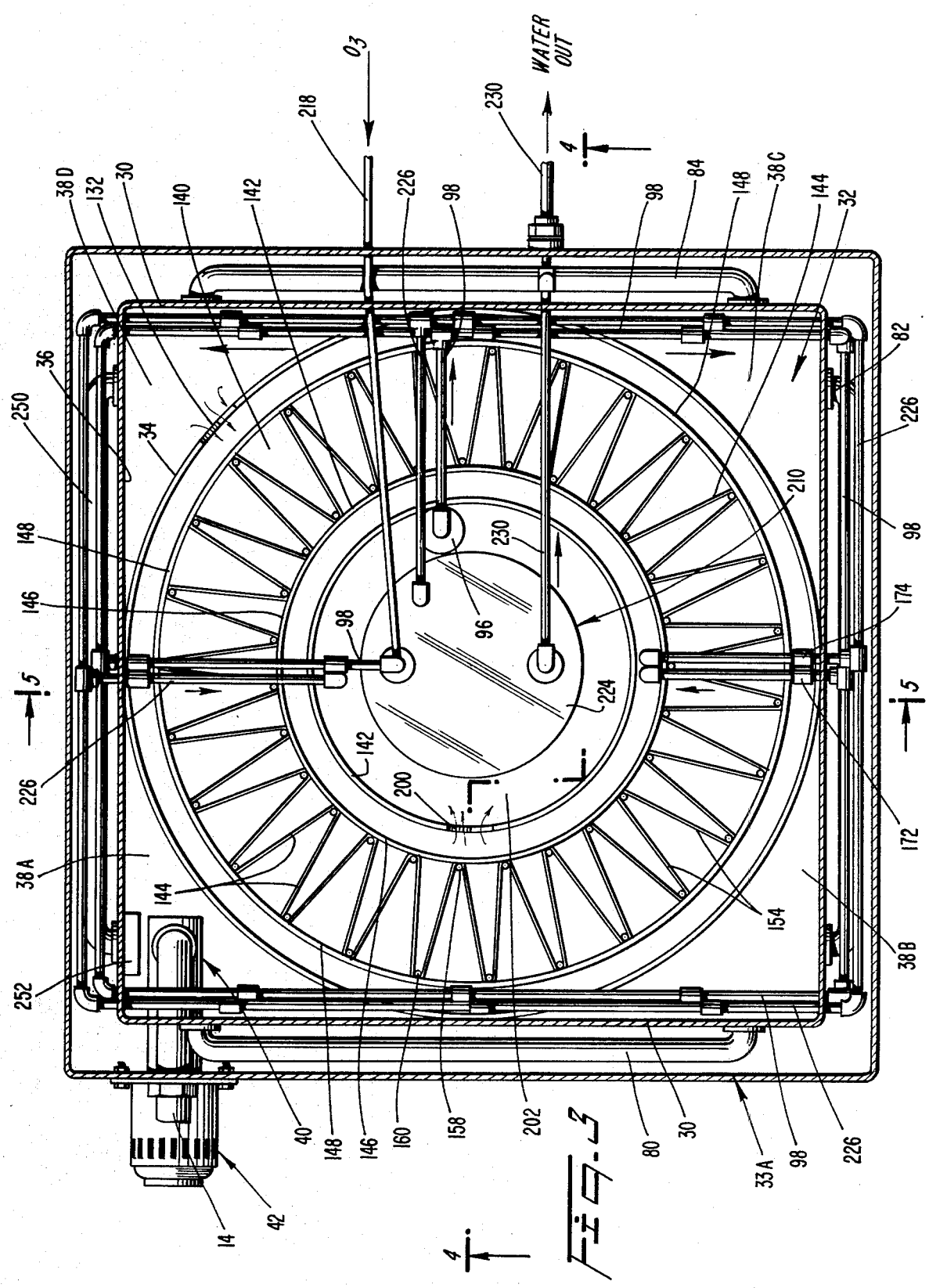

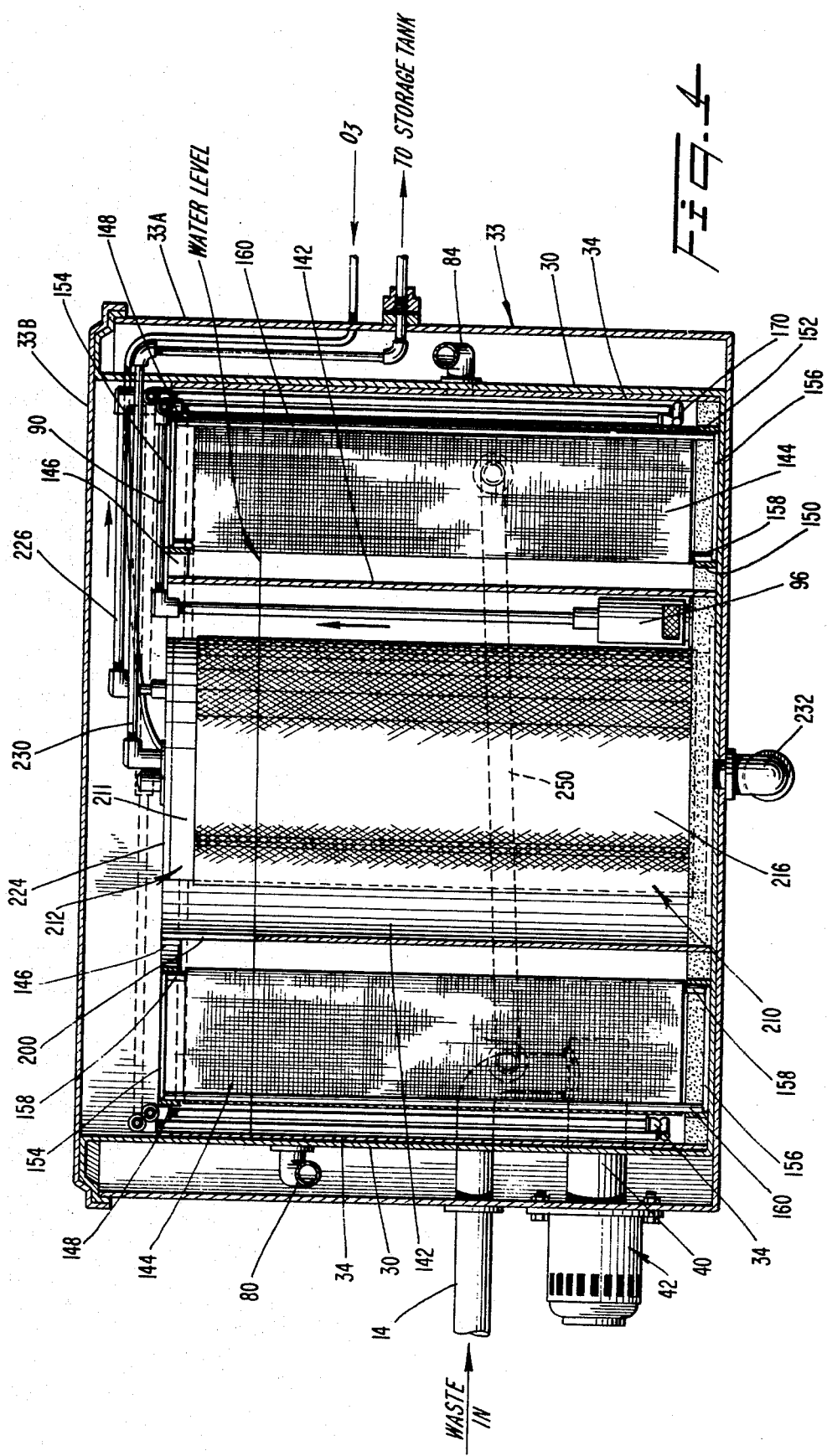

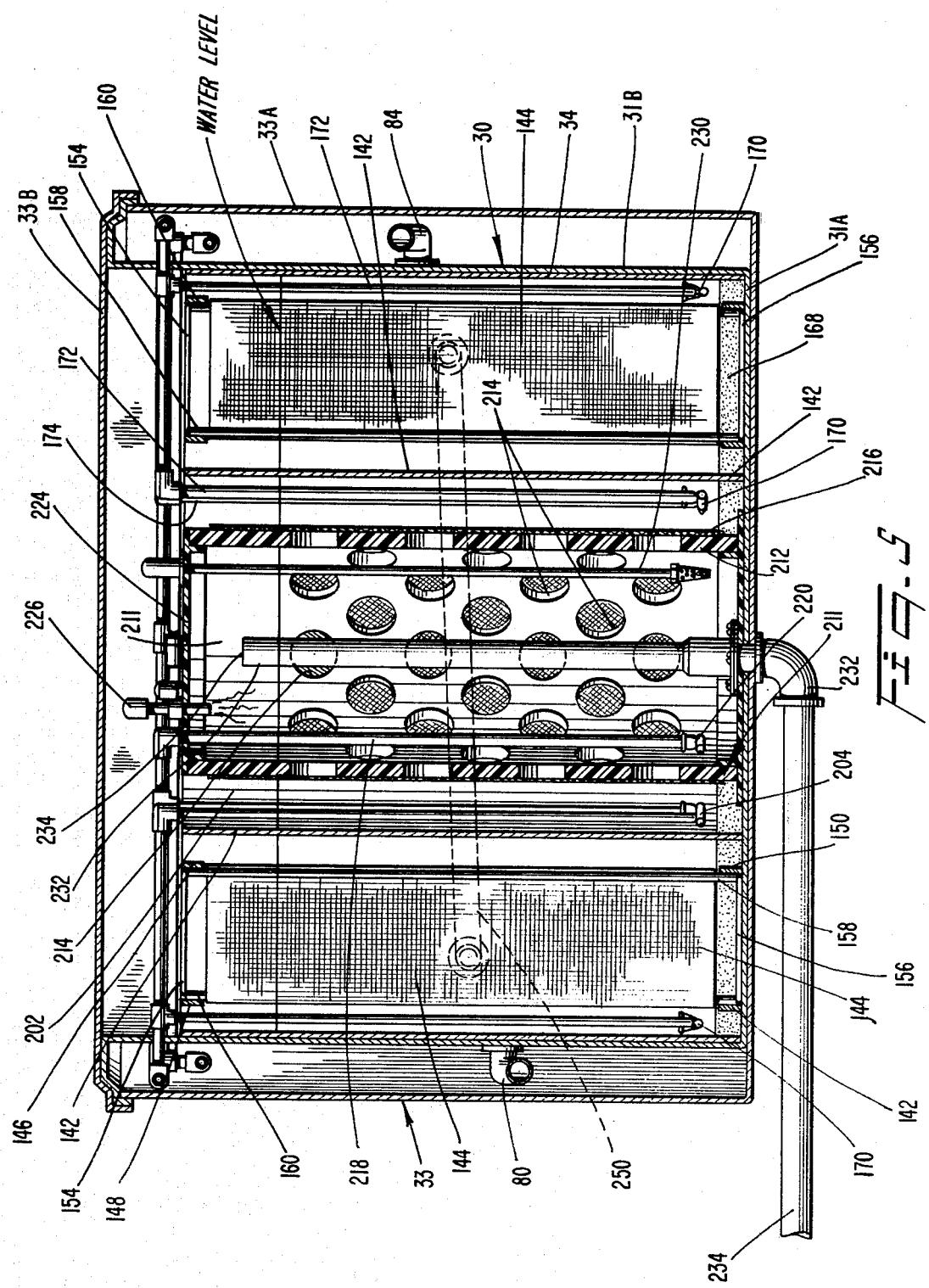

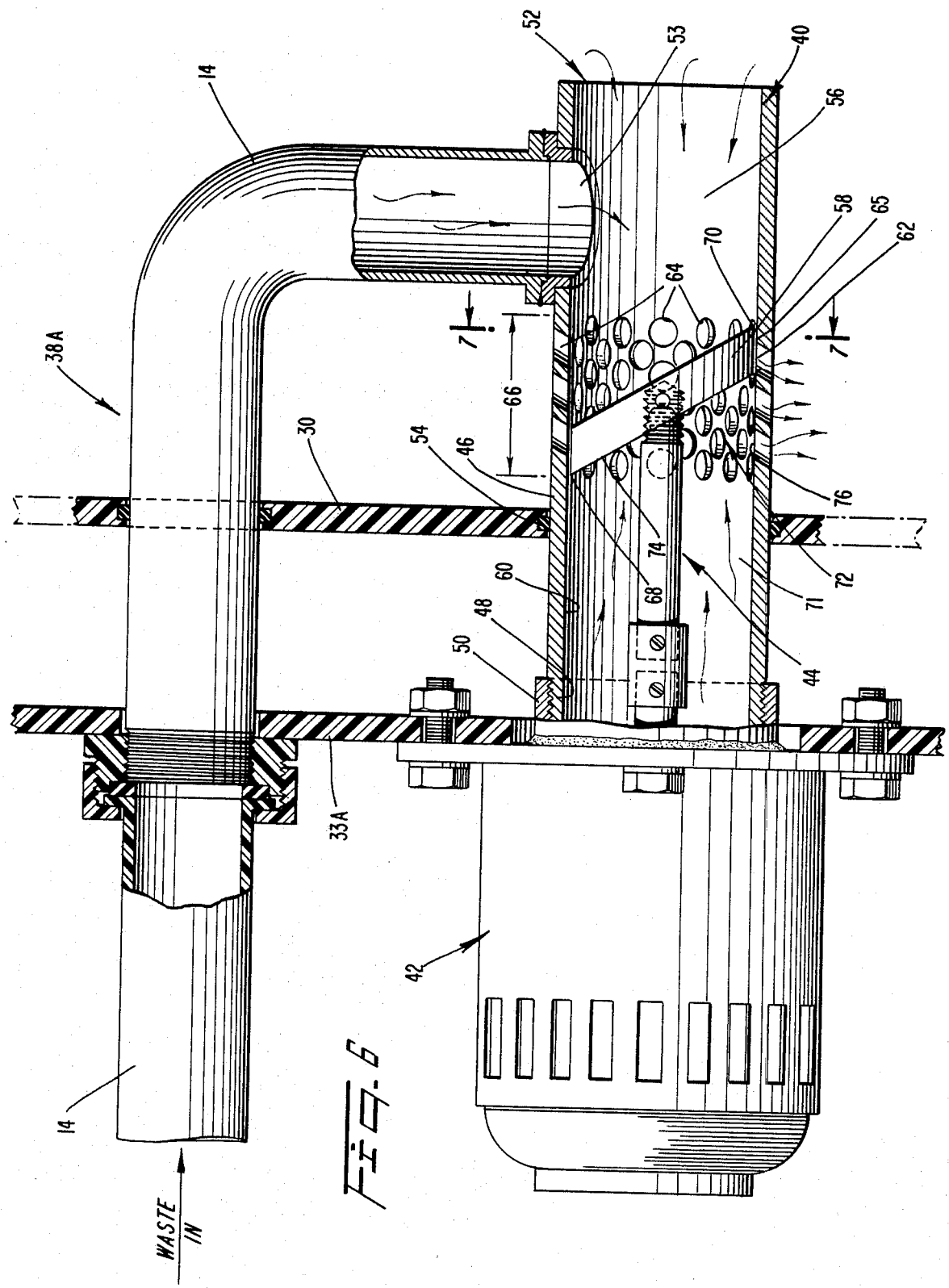

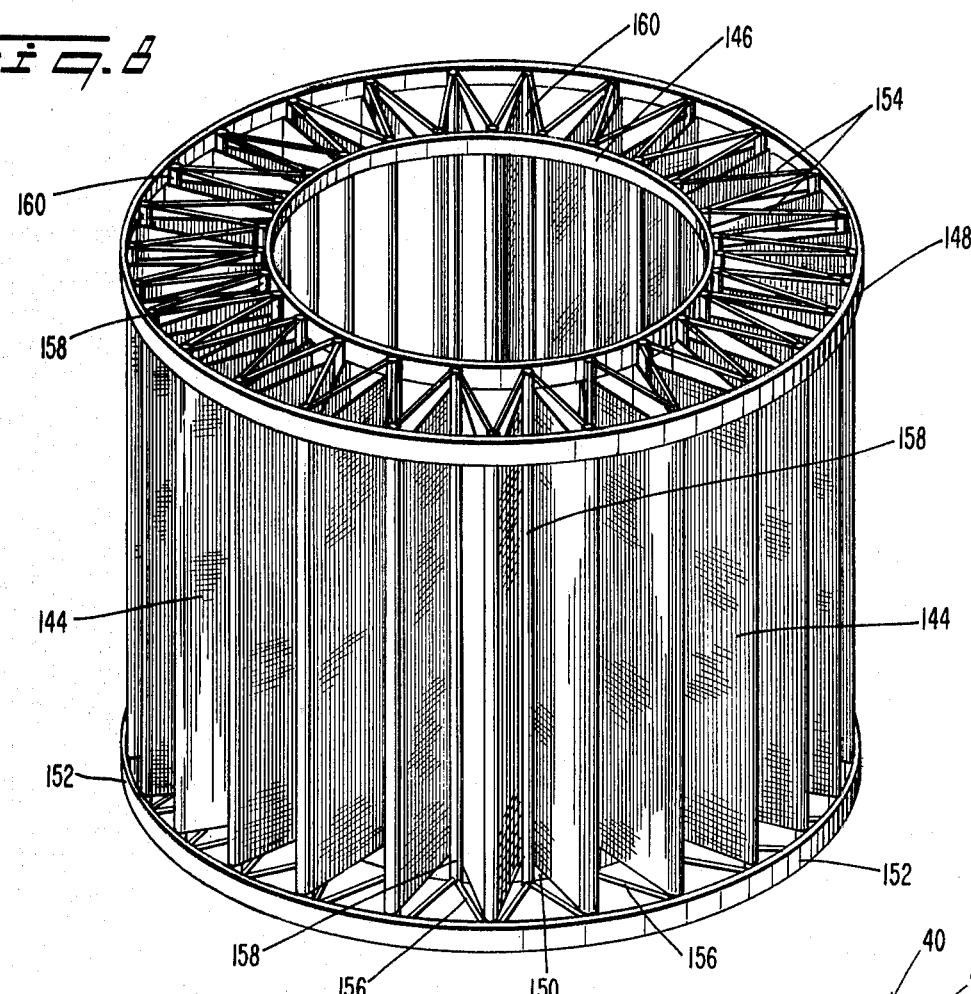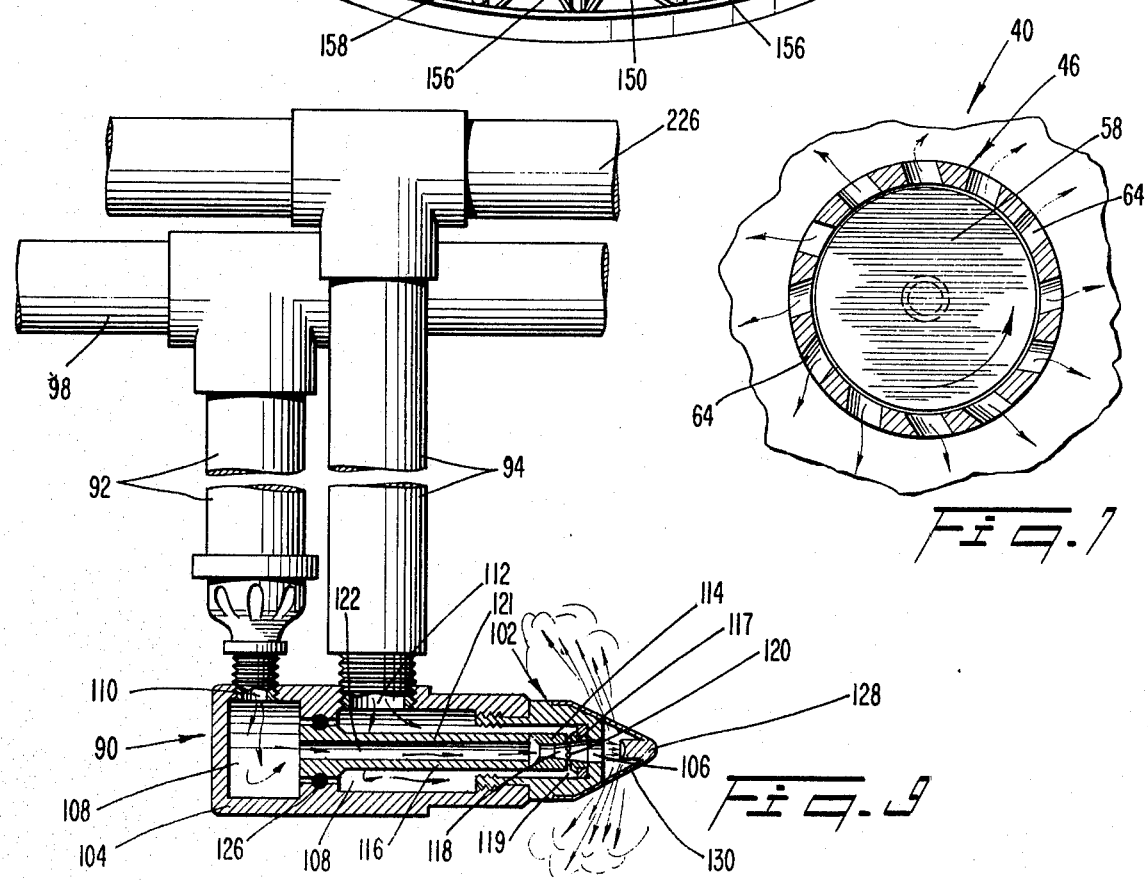

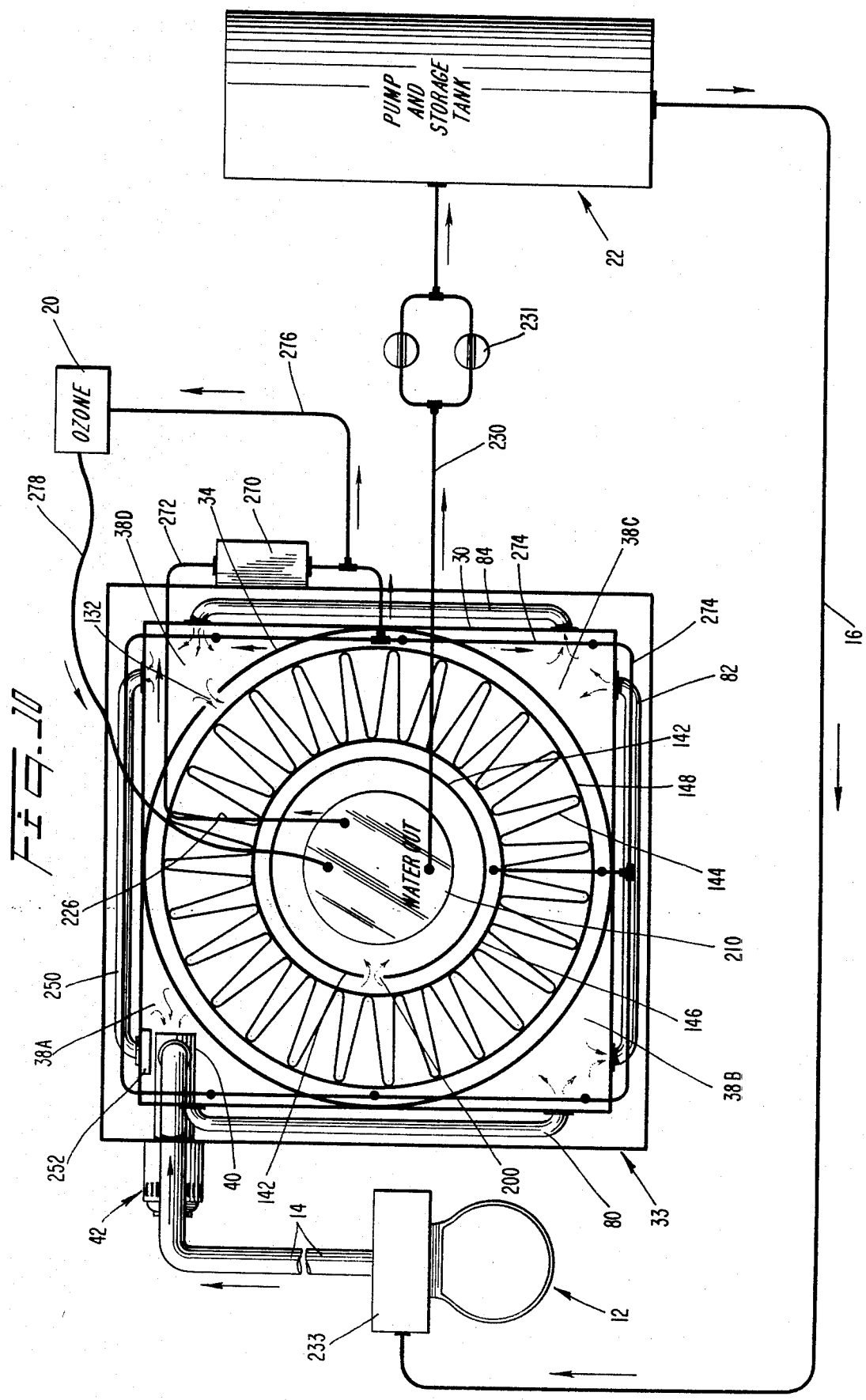

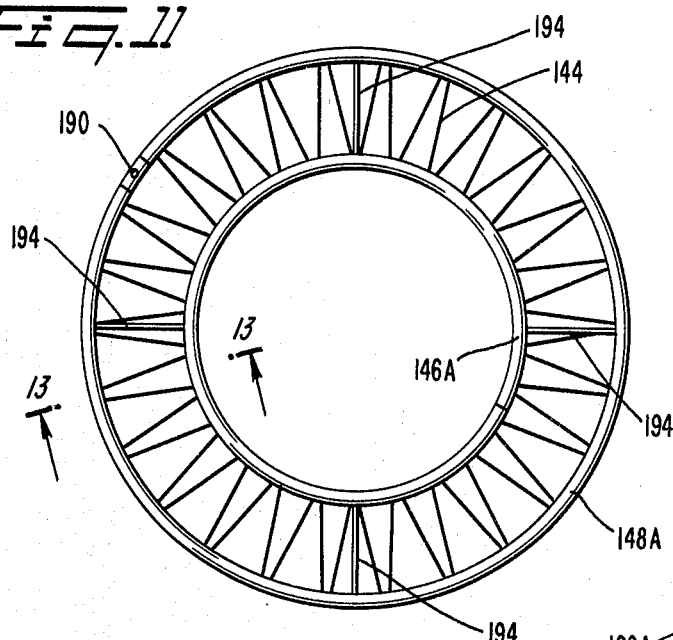
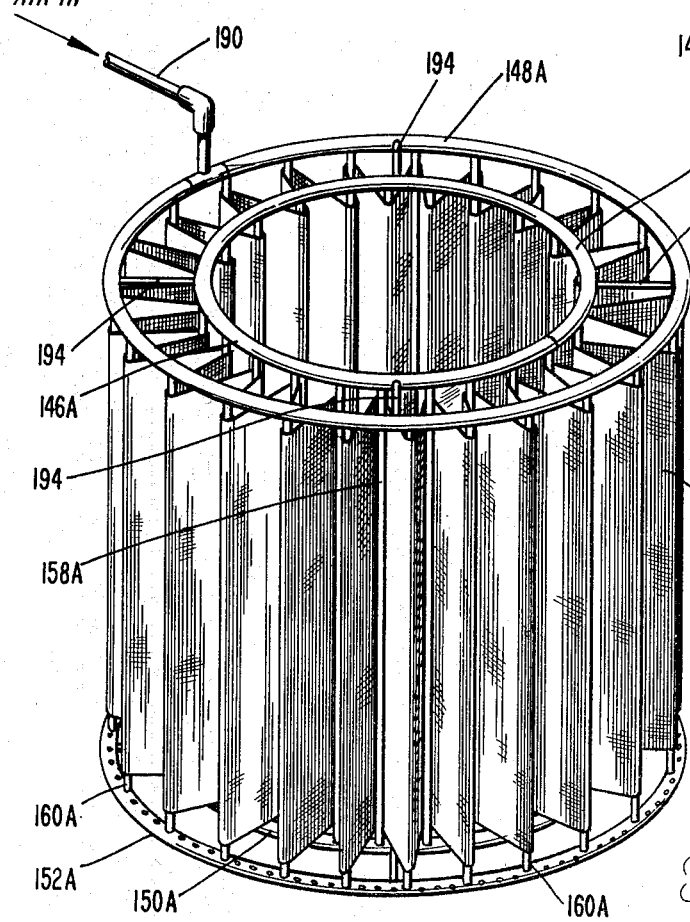
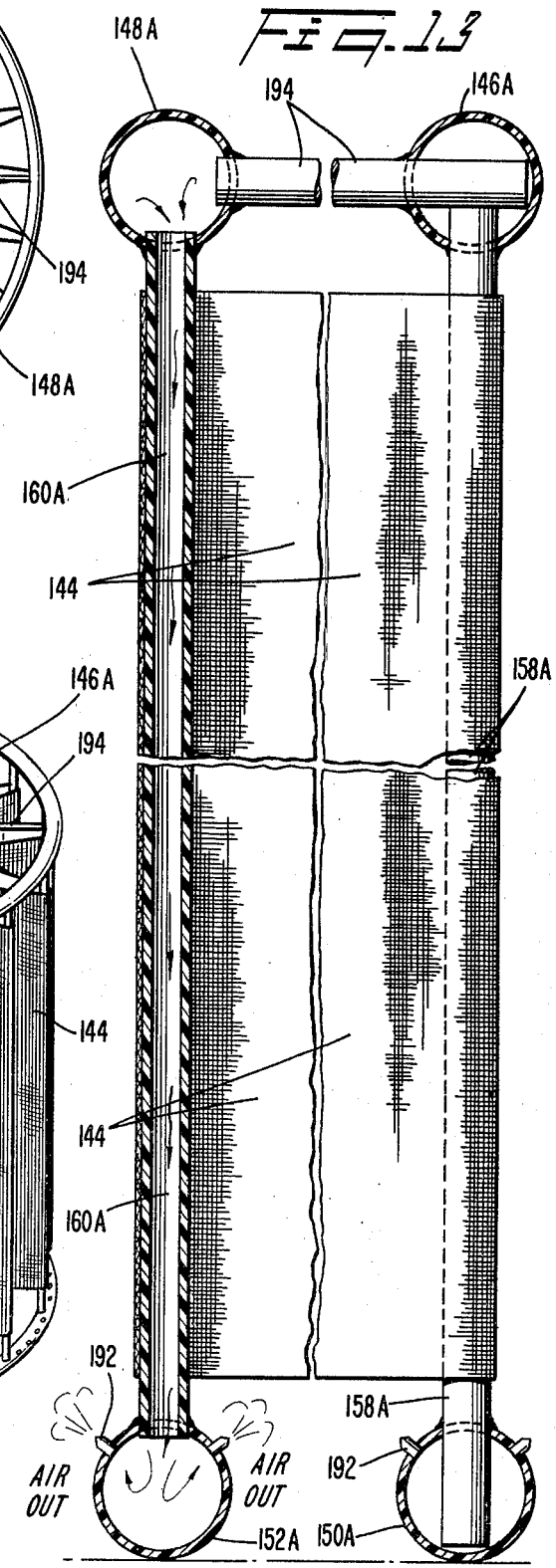

SEWAGE TREATMENT SYSTEM

BACKGROUND AND OBJECTS OF THE INVENTION

The present invention relates to sewage treatment, and especially to on-location, closed circuit treatments in which a sewage-containing liquid is purified and recycled.

While sewage produced in areas served by sewer systems can be treated at a main sewage treatment plant, areas not served by a sewer system commonly employ a septic system wherein raw sewage is delivered to a buried septic tank where the solid matter is broken down by bacteria. Part of the sewage in the tank is discharged into distributing pipes located beneath the ground surface and seeps into the soil where organic matter is further broken down. Besides requiring fresh water to flush toilets, etc., such a system requires land which can percolate sufficiently to drain the water. Thus, areas where percolation is not adequate or where water conservation is demanded are not well suited to conventional septic systems.

There have been heretofore proposed various water purification systems of an on-location type in which sewage is purified and then returned to the toilet(s).

In this regard, it has been proposed to deliver sewage-containing water to a macerator which grinds the solids and discharges same into a treatment chamber where bacterial action decomposes the waste material. Air is circulated within the treatment chamber to promote bacterial decomposition. Treated water is thereafter conducted to a settling chamber where solids settle to the bottom and form a sludge, and the sludge is recycled to the treatment chamber. Water from the settling chamber is conducted through a filter to a holding tank for eventual mixing with waste solids in a toilet.

It has also been proposed to achieve bacterial decomposition of the solids by passing the waste water through a filter upon which the bacterial cultures may breed. The expedient of disinfecting the water with ozone gas has also been proposed.

A problem which is characteristic of many prior art proposals involves the formation of sludge and the need to handle same by removal or recycling. This need adversely affects the convenience and capacity of the system. Also, the requirement of filters can lead to problems if the filters become clogged. Previously suggested on-location systems would have to be quite large and cumbersome, and involve an undesirably long residence time for water being treated, in order to achieve the necessary capacity to service a house or apartment.

It is, therefore, an object of the present invention to provide novel methods and apparatus for purifying sewage-containing liquid.

It is another object of the invention to provide a waste water treatment system which eliminates the formation of sludge.

It is yet another object of the invention to provide a waste water treatment system which effectively and rapidly decomposes waste material.

It is another object of the invention to provide a waste water treatment system which operates relatively rapidly and efficiently so as to be suitable to handle more than one toilet.

It is an additional object of the invention to provide a waste water treatment system which is highly compact and relatively simple in construction and operation.

SUMMARY OF THE INVENTION

These objects are achieved by the present invention which relates to an on-location sewage treatment apparatus for purifying sewage-containing liquid. The apparatus comprises a plurality of sewage pre-treatment compartments which are fluidly interconnected. A grinder receives sewage-containing liquid, grinds solid waste matter in the liquid, discharges the ground waste and liquid as a colloidal mixture into a first of the pre-treatment compartments, and readmits and regrinds the colloidal mixture from the first pre-treatment compartment. Oxygen is introduced into the compartments to promote aerobatic digestion of the waste. Treated liquid from a last of the pre-treatment compartments is conducted to an intensive treatment compartment comprising a porous upright sheet member supporting the growth of bacteria thereon which consumes waste matter passing therethrough. A disinfecting compartment is in fluid communication with the intensive treatment compartment to receive liquid passed through the sheet. Ozone gas is introduced into the disinfecting compartment to disinfect the water, with pure oxygen gas being produced as a reaction product. This oxygen gas is collected and conducted to the pre-treatment compartments.

Preferably there is provided a tank forming a chamber, a first wall is disposed in the chamber and contacts the chamber at a plurality of locations to form therewith the afore-mentioned plurality of pre-treatment chambers.

Preferably, the oxygen is introduced through a nozzle which generates sonic waves for disbursing the oxygen as it exits the nozzle.

THE DRAWINGS

These objects and advantes of the invention will become apparent from the following detailed description of a preferred embodiment thereof, in connection with the accompanying drawings in which like numerals designate like elements and in which:

FIG. 1 is a perspective schematic view depicting the basic components of a waste water treatment system according to the present invention;

FIG. 2 is a schematic plan view of the system depicted in FIG. 1 illustrating a first preferred system for conducting oxygen from a disinfecting compartment to a plurality of oxygen treatment compartments;

FIG. 3 is a more detailed plan view of a treatment container according to the present invention of the type depicted in FIG. 2;

FIG. 4 is a vertical sectional view taken along line 4—4 of FIG. 3;

FIG. 5 is a vertical sectional view taken along line 5—5 of FIG. 3;

FIG. 6 is a vertical sectional view taken through a pump grinder according to the present invention;

FIG. 7 is a sectional view through the pump grinder taken along line 7—7 of FIG. 6;

FIG. 8 is a perspective view of an accordian-pleated porous sheet and its support according to the present invention;

FIG. 9 is a longitudinal sectional view through a nozzle utilized in the present invention to inject and disburse gases;

FIG. 10 is a schematic plan view of a water treatment system according to the present invention utilizing a different embodiment of means for circulating oxygen gas;

FIG. 11 is a schematic plan view of an alternate embodiment of the support for the accordian-pleated porous sheeting;

FIG. 12 is a perspective view of the support depicted in FIG. 11; and

FIG. 13 is a vertical sectional view through a portion of the modified sheet support taken along line 13—13 of FIG. 11.

DETAILED DESCRIPTION OF A PREFERRED EMBODIMENT OF THE INVENTION

A preferred on-location sewage treatment system 10 according to the present invention is intended to be fluidly connected to one or more toilets 12, as in a home or apartment, for example (see FIG. 1). A sewage-conducting liquid, such as water, is contained within the system and mixes with the sewage at the toilet in conventional fashion. The sewage-containing water is conducted downwardly, by gravity flow in a delivery duct 14, to a treatment system 10, wherein the water is purified and recycled to the toilet via a return line 16. The system is basically a closed-circuit type of system, although excess purified water may be removed from the system via an overflow.

The treatment system includes a container 18 in which the water is treated, an ozonator 20 for supplying ozone to the water as part of the treatment, and a recycling pump/storage tank 22 to which the treated water is delivered prior to being recycled to the toilet 12. The container 18 comprises a tank 30 (FIGS. 3-5) having a floor 31A and upright walls 31B forming a chamber 32 therein of polygonal, preferably square, cross-section. The tank 30 is formed of any suitable material such as Fiberglas, PVC, metal, etc., capable of containing a sewage-water effluent. This tank 30 may, if desired, be contained within an enclosure 33 which includes a base 33A and a cover 33B, although such an enclosure is not required.

Disposed within the tank 30 is a first cylindrical wall 34 of circular cross-section which extends the height of the tank and whose outer diameter is equal in length to the horizontal dimension of each inner side of the square chamber 32. Thus, the first wall 34 abuts the inner surfaces 36 of the tank side walls at four locations midway between the tank corners to form four pre-treatment compartments 38A,B,C,D at the corners of the tank 30.

An initial one 38A of the pre-treatment compartments receives raw waste, such as human feces and cellulose (toilet paper), via the delivery duct 14 from the toilets. The delivery duct actually feeds into a pump grinder 40 which functions to pulverize and comminute the waste solids into a fine powdery substance entrained in the water. The pump grinder 40 (FIG. 6) is situated near the bottom of the first pre-treatment compartment 38A and comprises a conventional electric motor 42 mounted on the enclosure base 33A externally of the first pre-treatment compartment. The motor 42 includes a rotary output shaft 44 projecting through a water-tight seal in the enclosure base 33A and into the first pre-treatment compartment 38A. Connected to the enclosure base 33A is a circular cylindrical sleeve 46 whose longitudinal axis is aligned with the motor output shaft 44. The sleeve 46 projects through a seal 54 in the tank 30 and into the first pre-treatment compartment 38A. At its inner end the sleeve has external threads 48 which are screw-connected to internal threads on a fitting 50 affixed to the enclosure base 33A. The sleeve is open at its outer end 52 remote from the enclosure base 33A. The sewage inlet conduit 14 passes through the enclosure base and the tank 30 and communicates fluidly with the sleeve at a point 53 behind the sleeve open end 52.

It will be appreciated that if the enclosure 33 is omitted, the motor 42 and sleeve 46 could be affixed to the tank 30.

Mounted for rotation within a chamber 56 of the sleeve is a blade in the form of a disc 58. The disc 58 is affixed to the outer end of the output shaft 44 such that the plane of the disc 58 is situated at an acute angle (non-perpendicular) relative to the axis of the drive shaft. The disc is of elliptical configuration and is designed to conform to the interior surface 60 of the sleeve while spaced slightly therefrom. In this regard, the outer periphery 62 of the disc is disposed parallel to the surface 60 and is spaced therefrom by a very slight amount to form a gap 65. In one preferred working embodiment, the inner diameter of the sleeve is 2" and the gap 65 is 0.022". The sleeve 46 is provided with a series of apertures 64 disposed within a cylindrical region 66 of the sleeve defined by the rotational movement of the disc 58. That is, rotation of the motor output shaft 44 produces a corresponding rotation of the disc 58 within a region defined by the forwardmost and rearwardmost ends 68, 70 of the disc.

The area 71 within the sleeve 46 extending from the enclosure base 33A to initial ones of the apertures 64, remains filled with a liquid during operation of the pump. A pumping pocket 72 is formed in the region of the apertures and bordered by the sleeve and an inner face 74 of the disc. This pumping pocket is also bordered by liquid in the area 71, the latter defining, in effect, a fluid cushion for the pumping pocket. As the disc rotates at high speeds, e.g., on the order of 3450 rpm, for example, the rear face 74 of the disc travels rapidly through the water in the pocket, forcing that water outwardly through the apertures. This exiting of the water creates a strong suction in the pumping pocket which draws water and sewage into the sleeve via the open outer sleeve end 52 and/or the sewage inlet 53, and draws the water/sewage mixture through the gap 65. A beating and pulverizing action is imparted to the waste traveling through the gap. Thereafter, ejection of the pulverized waste through the apertures 64 produces further pulverization of the waste as the waste contacts the inner edges 76 of the apertures, which edges form cutting edges. Apertures of a ¼" diameter have been found to be particularly effective in this regard.

Preferably, the apertures extend non-radially relative to the rotary axis, to intensify the cutting action of the waste against the aperture edges (FIG. 7).

It has been found that in practice the pump grinder 40 transforms all waste solids into a fine, powdery form, the particles of which are of microscopic size. This powdery substance, as mixed with the water, results in a colloidal mixture emitted from the grinder into the first pre-treatment compartment 38A.

The open-endedness of the sleeve is of importance because it enables the colloidal mixture surrounding the grinder to be repeatedly cycled through the pump for yet further physical breakdown. This action is promoted by the fact that the denser colloidal mixture remains nearer to the bottom of the compartment, whereas cleaner water rises upwardly.

Importantly, by reducing the waste solids to a microscopic size, the resultant total surface area of the waste to be acted upon by bacteria is maximized, thereby promoting a rapid bacterial decomposition of the solids and avoiding the creation of sludge as would likely occur from the use of conventional waste mascerators.

Instead of arranging the sewage inlet 53 within the sleeve 46 as depicted, that inlet could be spaced from the open end 52 of the sleeve and directed theretowards so that sewage discharged from the inlet is sucked into that open end, along with the surrounding colloidal mix.

The initial pre-treatment compartment 38A communicates with the second pre-treatment compartment 38B by a first gravity-flow transfer conduit 80 inclined downwardly toward the second pre-treatment compartment to permit flow from the former to the latter. The first transfer conduit is disposed externally of the tank 30.

The second pre-treatment compartment 38B communicates with the third pre-treatment compartment 38C in similar fashion by means of an inclined second transfer conduit 82. In similar fashion, the third pre-treatment compartment 38C communicates with the final pre-treatment compartment 38D via an inclined third transfer conduit 84. Water is thus able to pass by gravity successively through the series-connected pre-treatment compartments while bacteria common to the waste matter attack and consume the latter by aerobic digestion. In order to promote such action there extends into each of the pre-treatment compartments an oxygen pipe which injects pure oxygen into the compartment from a source to be described later herein.

Importantly, the oxygen is highly dispersed in the form of millions of tiny bubbles which make oxygen available throughout the compartment for reaction with the waste for more rapid decomposition. This dispersion is achieved by employing conventional nozzles 90 (FIG. 9) in a unique manner. The nozzles 90 are disposed at the ends of water and oxygen conduits 92, 94 which extend downwardly, side-by-side into each of the pre-treatment compartments. The water is pumped by a pump 96 (FIG. 4) located further along in the treatment tank, as will be discussed, and is delivered to the vertical conduits 92 via a manifold 100.

The nozzles 90 are preferably of a type manufactured by the Sonic Development Corp. of Upper Saddle River, New Jersey, and comprise a head 102 and a cylindrical sleeve 104 connected thereto. The head 102 includes a center bore 196 and external screw threads which connect to internal threads at the front of the sleeve 104. The sleeve includes an internal chamber 108 to which is conducted water via a first port 110, and oxygen via a second port 112. Situated within the sleeve is an aspirator collar 114 and a chamber partition member 116. The aspirator collar 114 abuts against a shoulder 117 of the head 102 and includes an axial throughbore 118 aligned with the outlet 106 of the head, and a series of minute side openings 120 which extend inwardly in a forwardly inclined direction to communicate with the throughbore 118. The collar is of smaller diameter then the chamber 108 so as to form an outer passage 119 communicating with the openings 120.

The chamber partition member 116 includes front external screw threads 121 which are connectible to internal threads at the rear of the head 112. The threads 121 do not extend completely around the member 116; rather, the member 116 is flatened at opposite sides (not shown) to define liquid passages. The chamber partition forms a central passage 122 and comprises, in effect, a hollow rod 116 which abuts against a rear face of the collar 114. The rod 116 forces the collar 114 against the head 102 and is of smaller diameter than the chamber 108 to form continuations of the outer and inner passages 118, 119 of the collar. An O-ring seal 126 is disposed at the rear end of the rod 116 to fluidly seal the outer and inner passages from one another.

At the front of the head is mounted a dispersion cup 128 which is aligned with the longitudinal axis of the nozzle discharge opening 106. The dispersion member is supported by thin, spaced wires 130 which are affixed to the head 102.

In operation, water is forced through the water port 110, through the inner passage 108, 122, 118, and is discharged from the discharge opening 106. In so doing, the flowing water aspirates oxygen through the openings 120, the outer passage 108, 119 and the oxygen inlet 112. The air and water are mixed as the air emerges from the openings 120 and that mixture is directed against the dispersion cup 128. As a result, the mixture is dispersed in all directions, primarily rearwardly toward the water inlet. The wires 130 are of such nature that oscillation of the cup is produced by the impact of the mixture thereagainst so as to create sound waves which disperse the oxygen to a high degree, thereby forming thousands, or millions, of tiny oxygen bubbles. These bubbles thoroughly saturate the surrounding area to intensify the bacterial decomposition of the waste material.

Thus, waste matter emitted from the grinder 40 in the form of water-entrained powder, is continually acted upon by bacteria and recycled through the grinder, the aerobic digestive action of the bacteria being actively promoted by the continuously available oxygen. Cleaner water migrates to the top of the compartment and travels successively to the final pre-treatment compartment via the gravity transfer conduits.

As noted earlier, the nozzles 90 are of a conventional nature employed, however, in the manufacturer of artificial snow. Normal operation of the nozzles is quite different from the presently described use in that air is passed through the inner or central passage to aspirate water from the outer passage. The sonic action disperses the water into smaller particles which are formed into ice or snow.

At the final pre-treatment compartment 38D the cylindrical wall 34 includes a notch 132. Thus, water from this compartment 38D flows by gravity through the notch and into an intensive treatment compartment 140 formed between the first cylindrical wall 34 and a second cylindrical wall 142 spaced radially inwardly of the first cylindrical wall 34. Situated within the intensive treatment compartment 140 is a porous treatment surface in the form of a porous sheeting 144 arranged in a circular accordian-pleated configuration (as viewed from above) and thus forming a plurality of circumferentially spaced pockets which are open in a radially outward direction. The sheeting is mounted on a frame (FIG. 8) comprising inner and outer upper rings 146, 148 and inner and outer lower rings 150, 152. The inner and outer upper rings 146, 148 are interconnected by a series of braces 154, and inner and outer lower rings 150, 152 are interconnected by a series of braces 156. A plurality of inner upright bars 158 interconnect the inner rings 146, 150, and a plurality of outer upright bars 160 interconnect the outer rings 148, 152. The sheeting 144 is wrapped around the upright bars 158, 160 to form the accordian-pleated configuration, thereby maximizing the surface area to be contacted by the water being treated.

The sheeting 144 can be of any suitably porous nature, one preferable form of sheeting being formed of an Nylon ® felt material of about ⅛ inch thickness sold by American Felt and Filter Corp., 110 Canal St., Westerly, R.I. under NY 7209.

The sheeting 144 promotes the growth of bacteria thereon, either the usual bacteria found within the waste matter, or a specially bred commerical bacteria if desired. Upon installation of the sytem, it may be desirable to employ a commercially available bacteria so that a bacteria culture is present when the system is first placed into operation, rather than waiting for bacteria from the waste to breed. A layer 168 of sand lies at the bottom of the container into which layer the sheeting extends, to prevent the water from by-passing beneath the sheet.

As pre-treated water flows through the sheeting 144, it undergoes an intensive treatment by the bacteria which consumes any remaining waste matter by aerobic digestion. Aerobatic digestion is promoted by the introduction of oxygen into the intensive treatment compartment. Such introduction can be achieved by employing one or more sonic aeration nozzles 170 similar to those 90 described previously which are fed by oxygen and water conduits 172, 174. The nozzles are disposed on opposite sides of the sheeting to contact water flowing into and from the sheeting. The orientation of the nozzles is such as to expel fluid in directions generally tangent to the sheeting to create a circular flow around the sheeting for a more uniform treatment.

An alternative form of support for the sheeting is depicted in FIGS. 11–13. In that embodiment, the inner and outer rings 146A, 148A, 150A, 152B and the upright bars 158A, 160 are in the form of hollow tubes. Oxygen under pressure is delivered via conduit 190 to the outer upper tube 148A, and conducted to the lower inner tube 152A via the outer upright tubes 160A. The lower inner tube 150A contains openings with upwardly directed diffusers 192 to emit and disperse oxygen. The oxygen can also be delivered to the lower inner tube 150A via reinforcing tubes 194, the upper inner tube 146A, and the inner upright tubes 158A, and dispersed through diffusers 192.

A notch 200 formed in the second cylindrical wall 142 conducts water into a final oxygen treatment compartment 202. In this compartment, the water is subjected to oxygen gas pumped-in through a pipe 206 and discharged through a suitable atomizing device such as a sonic aeration nozzle 204 of the type 90 previously described which is supplied with water via conduit 205.

The pump 96, a conventional electric pump, is located in this compartment 202 and circulates water through the manifold 98 to operate the sonic aeration nozzles 90, 170, 204 in the manner previously described.

Communicating with the final oxygen treatment compartment 202 is a disinfecting compartment 210 (FIG. 5). In this compartment 210 the water is subjected to the disinfecting action of ozone gas supplied by the afore-mentioned ozonator 20 which is a conventional electrically operated mechanism for producing ozone gas. The ozone is fed into the disinfecting compartment which is defined by a porous third cylindrical wall 211.

This wall 211 preferably comprises a PVC pipe 212 which has openings 214 cut therein. A sheet 216 of porous nylon may optionally be provided to overlie the wall 211.

The wall 211 confines the ozone gas which is pumped-in through a conduit 218 and ejected through a sonic aspirator nozzle 220. The ozonator may be of the type available from Pure Air Products, 949 White Bridge Rd., Millington, N.J.

As the ozone gas enters the water, it attacks viruses and other harmful bacteria. Produced as a product of the chemical reaction of the ozone gas is pure oxygen gas which is collected at the top of the disinfecting compartment 210. In this regard, a cover 224 seats upon the wall 211 to close-off the space above the water in the disinfecting compartment to prevent escape of the oxygen gas. The openings 214 in the wall 211 are spaced below the normal water level to also prevent such escape. This trapped oxygen gas constitutes the source of pure oxygen supplied to the sonic aeration nozzles 90, 170, 204 as previously discussed. A conduit 226 communicates with the upper end of the disinfecting compartment to conduct the oxygen to the respective nozzles in response to the aspirating action produced by water traveling through these nozzles.

Purified water from the disinfecting compartment is drawn-off through a conduit 230 by the pump 22 and is stored therein for eventual reuse. The pump 22 comprises a standard shallow well pump of the type which incorporates a storage tank therein. If desired, a conventional charcoal filter cartridge 231 may be disposed in the conduit 230 to remove unwanted pigment from the water.

Water from the pump storage tank is supplied to the toilet tank 233 as the previously-stored water therein empties into the toilet bowl. At the same time, the pump is actuated by the toilet flush handle to replenish the pump storage tank.

In the event that the system becomes over-charged with water, an overflow outlet conduit 232 is provided in the disinfecting compartment 210. Excess water enters the overflow inlet 234 near the top of the compartment 210 and travels to a suitable location such as a stream or well for example. This excess of water may occur if the system is connected to receive water from sinks, tubs, etc., while supplying only the toilets.

In some instances it may occur that some slight amount of scum forms at the top of the final pre-treatment compartment 38D. While the formation of such scum is to be expected and does not adversely affect the operation of the system nor produce a foul odor, it may be desirable, for the sake of appearance, to remove the scum by agitating and dispersing it, or by drawing it off. The latter expedient may involve the use of a conduit 250 having an inlet disposed at the expected water level of the final pre-treatment compartment 38D and an outlet at the bottom of the initial pre-treatment compartment.

As noted earlier, pure oxygen from the top of the disinfecting compartment is positively advanced to the sonic aeration nozzles by water-induced suction at the nozzles. An alternative means for inducing the flow of oxygen involves the use of a pump 270 (FIG. 10) which draws-out the oxygen via a conduit 272 and delivers it to an oxygen manifold 274 for delivery to sonic aeration nozzles or other diffusers. Such a system could replace the pump-driven water conduit system 96, 98. Positive oxygen flow from the pump 270 could also be directed via conduit 276 to the ozonator 20 to induce the flow of ozone to the disinfecting compartment via conduit 278, in lieu of the pump 222. In operation, water is maintained in the container 18 at all times. The level of the water is determined at the disinfecting compartment, the level normally being disposed above the notch 200 in the second cylindrical wall but below the inlet to the overflow conduit 232. Thus, the sewage-containing water in the various oxygen treatment compartments 38A,B,C,D, 140, 202 is subjected to aerobic digestion by bacteria therein. Water disposed in the disinfecting compartment 210 undergoes a continuous disinfecting treatment by ozone gas which is continually circulated therein.

As a by-product of this reaction, pure oxygen is formed which is collected at the top of the disinfecting compartment 210 and is conducted to the sonic aeration nozzles 90, 170, 204 in the oxygen treatment compartments. Water is pumped to each of those nozzles by the pump 96 (FIG. 4) located in one of the oxygen treatment compartments 202. This water flows through the inner passage 108, 122, 118 in each nozzle and aspirates oxygen from the outer passage 108, 119 (FIG. 9). The air/water mixture ejected from the nozzle impinges against the deflecting cup 128, the latter generating sound waves which disperse the oxygen gas, thereby creating thousands or millions of tiny bubbles which saturate the respective oxygen treatment compartment. As a result, the aerobic digestion by the bacteria is intensively promoted by the oxygen. This operation occurs continually as the water sits in the container.

When the toilet 12 is flushed, so as to empty the toilet storage tank into the bowl, water in the toilet storage tank is immediately replaced from the storage tank of the main supply pump 22. At the same time, the latter pump 22 is activated to draw fresh water from the disinfecting compartment 210 to replenish the pump storage tank. Removal of water from the disinfecting compartment 210 produces a corresponding gravitational movement of water throughout the container 18. That is, water from the final oxygen treatment compartment 202 passes through the holes 214 in the third wall 211. In response thereto, water from the intensive treatment compartment passes through the notch 200 in the second wall 142 and enters the final oxygen treatment compartment 202. This enables water within the intensive treatment compartment 140 to pass through the bacteria-containing sheet 144, whereupon further aerobic digestion of waste occurs. In response thereto, water from the final pre-treatment compartment 38D passes through the notch 132 in the first wall 34 and enters the intensive treatment compartment 140. Water from the third pre-treatment compartment 38C enters the final pre-treatment compartment 38D via the gravity conduit 84; water from the second treatment compartment 38B gravitates into the third pre-treatment compartment 38C via the gravity conduit 82; and water from the first pre-treatment compartment 38A gravitates into the second pre-treatment compartment 38B via the gravity conduit 80.

Flushing of the toilet further activates the pump grinder 40 which functions to suck-in the sewage and grind same to a powder which is ejected as a colloidal mixture into the first pre-treatment compartment 38A. As the grinder continues to operate, the colloidal mixture in the vicinity of the grinder is sucked back into the grinder and reground. The grinder may be activated for a predetermined period of time following flushing before stopping, or the grinder may be set to operate at regular intervals whether or not the toilet is flushed.

It will be appreciated that the present invention provides a water treatment facility which decomposes waste matter in a highly effective and rapid manner. Since the pump grinder continually regrinds waste material, it is assured that the waste matter being treated starts out at a microscopic size and is readily attacked by bacteria. The bacterial digestion is intensively promoted by the production of pure oxygen which is highly disbursed by the sonic aeration nozzles to saturate the various compartments. The high content of pure oxygen in any given sample of water in the oxygen treatment compartments assures that a very rapid digestion of the waste matter can occur. Accordingly, no sludge is produced by the present invention, even when a relatively short residence time of the waste water is needed.

The provision of a circular accordian-pleated sheet which supports a bacteria culture, further assures that a thorough and intensive treatment of the waste matter by the bacteria will occur. The large surface area presented by the accordian-pleat facilitates handling of a relatively large volume of waste water. There is no danger of clogging because any remaining waste particles are smaller than the pores in the sheet 144.

Effective support of the bacterial digestion occurs through the use of pure oxygen. The latter is supplied economically as a reaction product of the ozone treatment. An alternative is to employ ambient air which contains impurities as well as a smaller ratio of oxygen.

The overall arrangement of the compartments is highly efficient and compact, rendering the system highly ideal for use within a small area. This is achieved due to the employment of the outer main wall and an inner wall which contacts the former at spaced locations to define therewith the pretreatment compartments. The various walls of the system cooperate to form the various compartments thereby minimizing the size and cost of the system.

The alternate embodiment wherein the accordian-sheet support assembly is formed of oxygen-conducting tubes, provides further simplification of the system and efficient use of its components.

Although the invention has been described in connection with a preferred embodiment thereof, it will be appreciated by those skilled in the art that additions, modifications, substitutions, and deletions may be made without departing from the spirit and scope of the invention as defined by the appended claims.

What is claimed is:

1. In a sewage treatment apparatus of the type comprising tank means, a grinder submerged in said tank means, means for delivering sewage-containing liquid to said tank means such that solid waste matter is ground into a colloidal mixture by said grinder, sonic nozzles submerged in said tank means, means for delivering oxygen-containing gas to said nozzles which gas is converted by said nozzles into minute oxygen-containing bubbles which permeate the liquid and support the aerobic digestive action of bacteria in the liquid, and means for delivering ozone gas to the treated liquid to disinfect same for delivery to an outlet, the improvement wherein:

said tank means comprises:
a plurality of aerobic pre-treatment compartments interconnected in series for gravity-flow communication, a first of said aerobic pre-treatment compartments having an inlet communicating with said liquid delivery means for receiving sewage-containing liquid and conducting same downstream by gravity flow to a succeeding pre-treatment compartment, said grinder means communicating with said inlet for grinding all solid waste matter in said liquid and discharging the ground waste and liquid as a colloidal mixture into said first pre-treatment chamber, some of said sonic nozzles being submerged in said pre-treatment compartments to saturate the latter with minute oxygen-containing bubbles to support aerobic digestive action of bacteria, an intensive aerobic treatment compartment connected by gravity flow with a final one of said aerobic pre-treatment compartments, said intensive treatment compartment including an outer wall and containing therein an upright porous member forming a closed loop which is spaced inwardly from said outer wall, said porous member forming circumferentially spaced pockets which are open in a radially outward direction, said porous member supporting the growth of bacteria thereon for consuming waste matter, said porous member being disposed across the path of travel of the pre-treated liquid toward said oulet, and having its lower end sealed against the passage of liquid therebeneath, so that all of the pre-treated liquid is required to pass through the porous member, some of said sonic nozzles being disposed in said intensive treatment compartment between said wall and said porous member to saturate said pre-treatment compartment with minute oxygen-containing bubbles, said last-named sonic nozzles having their outlets oriented for establishing a circular flow of liquid in one direction around said porous member, a disinfecting compartment disposed within the closed loop formed by said porous member and communicating with said intensive treatment compartment by gravity flow, and nozzle means submerged in said disinfecting compartment and communicating with a source of ozone gas for saturating the liquid in said disinfecting compartment with ozone gas bubbles to disinfect the liquid.

2. Apparatus as defined in claim 1, wherein the bottom of said porous member is embedded in sand to seal against the passage of liquid therebeneath.

3. Apparatus as defined in claim 1, wherein said porous member consists of a sheet which is ⅛ inch thick.

4. Apparatus as defined in claim 1, wherein said porous member comprises a porous sheet, a support for said sheet comprises a pair of endless hollow tubes disposed horizontally at upper and lower ends of said sheet, and upright hollow tubes interconnecting said endless tubes and around which said sheet is wound, an upper one of said endless tubes being converted to a source of oxygen-containing gas, and a lower one of said endless tubes having outlets for discharging oxygen-containing gas conducted thereto through said upright tubes.

5. Apparatus as defined in claim 1, wherein said porous member is of accordian-pleated configuration.

6. Apparatus as defined in claim 1 including a toilet connected in closed circuitry with said inlet and with an outlet of said disinfecting compartment such that waste from said toilet enters said inlet and induces gravity flow of liquid through said pre-treatment compartments and said intensive treatment compartment.

7. Apparatus as defined in claim 1 including collecting means for collecting essentially pure oxygen gas as a reaction product in said disinfecting compartment, and means communicating with said collecting means for conducting said essentially pure oxygen gas to said sonic nozzles in said pre-treatment and intensive treatment compartments.

8. Apparatus as defined in claim 1 or 6, including a tank forming a polygonal chamber, said outer wall being circular and intersecting sides of said chamber to form therewith said pre-treatment compartments.

9. In a sewage treatment apparatus of the type comprising tank means, a grinder submerged in said tank means, means for delivering sewage-containing liquid to said tank means such that solid waste matter is ground into a colloidal mixture by said grinder, a plurality of sonic nozzles submerged in said tank means, means for delivering oxygen-containing gas to said nozzles which gas is converted by said nozzles into minute oxygen-containing bubbles which permeate the liquid and support the aerobic digestive action of bacteria in the liquid, and means for delivering ozone gas to the treated liquid to disinfect same for delivery to an outlet, the improvement wherein:

said tank means comprises:

a plurality of aerobic pre-treatment compartments interconnected in series for gravity-flow communication, a first of said aerobic pre-treatment compartments having an inlet communicating with said liquid delivery means for receiving sewage-containing liquid and conducting same downstream by gravity flow to a succeeding pre-treatment compartment, said grinder means communicating with said inlet for grinding all solid waste matter in said liquid and discharging the ground waste and liquid as a colloidal mixture into said first pre-treatment chamber, some of said sonic nozzles being submerged in said pre-treatment compartments to saturate the latter with minute oxygen-containing bubbles to support aerobic digestive action of bacteria, an intensive aerobic treatment compartment connected by gravity flow with a final one of said aerobic pre-treatment compartments, said intensive treatment compartment containing an upright porous member forming a closed loop which is spaced inwardly from a wall defining said intensive treatment compartment, said porous member supporting the growth of bacteria thereon for consuming waste matter, said porous member being disposed across the path of travel of the pre-treated liquid toward said outlet, and having its lower end sealed against the passage of liquid therebeneath, so that all of the pre-treated liquid is required to pass through the porous member, some of said sonic nozzles being disposed in said intensive treatment compartment to saturate said pre-treatment compartment with minute oxygen-containing bubbles, and a disinfecting compartment disposed within the closed loop formed by said porous member and communicating with said intensive treatment compartment by gravity flow, nozzle means submerged in said disinfecting compartment and communicating with a source of ozone gas for saturating the liquid in said disinfecting compartment with ozone gas bubbles to disinfect the liquid, collecting means for collecting essentially pure oxygen formed as a reaction product in said disinfecting compartment, and means communicating with said collecting means for conducting said essentially pure oxygen gas to said sonic nozzles in said pre-treatment and intensive treatment compartments.

10. An on-location sewage treatment apparatus for purifying sewage-containing liquid, said apparatus comprising:

a tank forming a polygonal chamber, a first annular wall disposed within said chamber and intersecting sides of the latter for forming therewith a plurality of series-connected pre-treatment compartments, grinder means for:
 receiving sewage-containing liquid,
 grinding waste solids therein, and
 introducing the liquid and ground waste to form a colloidal mixture into a first of said pre-treatment compartments, conduit means for conducting the colloidal mixture by gravity from said first pre-treatment compartment successively to the remaining pre-treatment compartments, the waste matter therein being aerobically consumed by bacteria in each of said pre-treatment compartments, an annular porous second wall disposed within and spaced from said first wall for defining a disinfecting compartment, means for introducing ozone gas into said disinfecting compartment to disinfect the liquid, collecting means for collecting essentially pure oxygen gas formed as a reaction product in said disinfecting compartment, sonic means for saturating all of said pretreatment compartments and said intensive treatment compartment with minute oxygen bubbles comprising:

means for generating sound waves in said pre-treatment compartments and said intensive treatment compartment beneath the liquid levels therein, and means for communicating with said collecting means for conducting said essentially pure oxygen gas to said pre-treatment compartments and said intensive treatment compartment beneath the liquid levels therein and for directing such oxygen gas into contact with the sound waves such that the oxygen gas is sonically dispersed and saturates said pre-treatment compartments and said intensive treatment compartment with minute bubbles of oxygen gas, to promote the aerobic digestive action of the bacteria sufficiently to prevent the accumulation of sludge, an upright porous screen disposed within said intensive treatment compartment, said screen forming a closed loop which is spaced inwardly from said first wall, said screen forming circumferentially spaced pockets which are open in a radially outward direction, said screen supporting the growth of bacteria thereon for consuming waste matter, said screen being disposed across the path of travel of the pre-treated liquid, and having its lower end sealed against the passage of liquid thereunderneath, so that all of the pre-treated liquid is required to pass through the screen, some of said sonic nozzles in said intensive treatment compartment being situated between said first wall and said screen and having their outlets oriented for establishing a circular flow of liquid in one direction around said porous screen.

11. Apparatus as defined in claim 10, wherein said tank forms a square chamber and said first wall is circular and intersects the sides of said square chamber to form therewith said pre-treatment compartments.

* * * * *